US008938420B1

(12) United States Patent
Thakur et al.

(10) Patent No.: US 8,938,420 B1
(45) Date of Patent: Jan. 20, 2015

(54) SYSTEMS AND METHODS FOR NATURAL BATCHING OF I/O OPERATIONS ON A REPLICATION LOG

(75) Inventors: Satyendra Thakur, Sunnyvale, CA (US); Kirubakaran Kaliannan, Beaverton, OR (US); Shailesh Marathe, Maharashtra (IN); Niranjan Pendharkar, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 167 days.

(21) Appl. No.: 13/558,977

(22) Filed: Jul. 26, 2012

(51) Int. Cl.
*G06F 17/30* (2006.01)

(52) U.S. Cl.
CPC ........ *G06F 17/302* (2013.01); *G06F 17/30144* (2013.01)
USPC .......................................................... 707/615

(58) Field of Classification Search
CPC ................................................. G06F 2201/855
USPC ......................................................... 707/615
See application file for complete search history.

(56) References Cited

U.S. PATENT DOCUMENTS

| 6,131,094 | A  | * | 10/2000 | Gord ..................................... 1/1 |
| 6,408,310 | B1 | * | 6/2002  | Hart ...................................... 1/1 |
| 6,412,080 | B1 | * | 6/2002  | Fleming et al. ................... 714/15 |
| 7,103,586 | B2 | * | 9/2006  | Holenstein et al. .................... 1/1 |
| 7,908,515 | B1 | * | 3/2011  | Schechner et al. ............... 714/15 |
| 2004/0250031 | A1 | * | 12/2004 | Ji et al. ............................ 711/162 |
| 2005/0154786 | A1 | * | 7/2005  | Shackelford .................. 709/217 |
| 2005/0204106 | A1 | * | 9/2005  | Testardi .......................... 711/162 |
| 2008/0082592 | A1 | * | 4/2008  | Ahal et al. ...................... 707/204 |
| 2008/0104443 | A1 | * | 5/2008  | Akutsu et al. ...................... 714/6 |
| 2009/0300304 | A1 | * | 12/2009 | Boyd et al. ..................... 711/162 |
| 2010/0115218 | A1 | * | 5/2010  | Hutchison et al. ............. 711/162 |
| 2010/0332776 | A1 | * | 12/2010 | Uchikado et al. .............. 711/162 |
| 2011/0099342 | A1 | * | 4/2011  | Ozdemir ........................ 711/162 |

OTHER PUBLICATIONS

Veritas™ Volume Replicator Administrators Guide, published Dec. 7, 2009, Document Version 5.1.0, retrieved on Feb. 28, 2014 from http://docs.oracle.com/cd/E19186-01/875-4628-10/875-4628-10. pdf, 434 pages.*
Screen print of metadata showing publication date Dec. 7, 2009 for above mentioned Non-Patent Document, Veritas™ Volume Replicator Administrators Guide, published Dec. 7, 2009, Document Version 5.1.0, retrieved on Feb. 28, 2014 from http://docs.oracle.com/cd/E19186-01/875-4628-10/875-4628-10.pdf, 434 pages.*

* cited by examiner

*Primary Examiner* — James Trujillo
*Assistant Examiner* — Edward Jacobs
(74) *Attorney, Agent, or Firm* — ALG Intellectual Property, LLC (57) ABSTRACT

A computer-implemented method for natural batching of I/O operations on a replication log may include: 1) identifying a replication log that records the order of writes within a cluster replication system, 2) determining that the replication log is unavailable, 3) queuing incoming I/O operations for the replication log in a single batch while the replication log is unavailable, 4) determining that the replication log has become available, 5) ceasing queuing of incoming I/O operations for the replication log based on the determination that the replication log has become available, and 6) grouping a plurality of I/O operations in the single batch for processing in parallel by assigning a same generation number to the plurality of I/O operations. Various other methods, systems, and computer-readable media are also disclosed.

20 Claims, 8 Drawing Sheets

SYSTEMS AND METHODS FOR NATURAL BATCHING OF I/O OPERATIONS ON A REPLICATION LOG

BACKGROUND

Individuals and businesses often seek ways to prevent the unintended loss of valuable data. For example, an entity may back up data by replicating the same from a primary site to a secondary site. In many cases, the copy of data at the secondary site is continuously updated to mirror the primary site.

In some cases, computing systems at the primary and/or secondary site may belong to a data cluster. Clustered computing systems may allow applications to continue on another node when a node within a particular cluster fails.

In general, dependent writes performed at the primary site must be performed in the same order at the secondary site. In contrast, independent, or concurrent, writes may be performed in parallel. Because of this, replication systems often use replication logs to track the order of such writes. These systems may also distinguish between dependent and concurrent writes, but may err on the side of designating a write as dependent. Unfortunately, such systems may be required to update the replication log for each and every concurrent write, which may introduce a significant performance overhead. These systems may also designate writes as concurrent or dependent based on write completion time, which may be imprecise. For example, additional dependent writes may occur between the time that write completion is reported to an application and the time that write completion is reported to a node that manages the replication log.

SUMMARY

As will be described in greater detail below, the instant disclosure generally relates to systems and methods for accurately distinguishing between concurrent and dependent writes in order to enable cluster replication systems to apply writes to replication logs as a whole instead of individually. In one example, a computer-implemented method for accomplishing such a task may include 1) identifying a replication log that records the order of writes within a cluster replication system in order to preserve write order fidelity between a primary site and a secondary site, 2) determining that the replication log is currently unavailable, 3) queuing incoming I/O operations for the replication log in a single batch while the replication log is unavailable, 4) determining that the replication log has become available, 5) ceasing queuing of incoming I/O operations for the replication log based on the determination that the replication log has become available, and 6) grouping a plurality of I/O operations in the single batch for processing in parallel by assigning a same generation number to the plurality of I/O operations.

Assigning the same generation number may include assigning the same generation number to each I/O operation in the single batch. The method may further include applying all of the I/O operations in the single batch to the replication log through one logical IO operation. The method may also include, prior to applying the I/O operations in the single batch, adding padding to align a size of the single batch from an odd to an even size.

Assigning the same generation number may include transmitting a request for a generation number from a requesting node that identifies the single batch to a coordinating node within the cluster replication system. The coordinating node may 1) receive a plurality of requests that each identify a respective batch of I/O operations, 2) batch the plurality of requests that each identify a respective batch of I/O operations, and 3) assign the same generation number to each request in the batch of requests.

Assigning the same generation number may include transmitting, by a transmitting node to the coordinating node, a completed generation number that identifies a generation number of at least one I/O operation last applied to the replication log by the transmitting node. Assigning the same generation number may further include the coordinating node assigning the generation number to the request by determining that a current generation number at the coordinating node is greater than the received completed generation number at the requesting node, and then assigning the current generation number to the request. Assigning the same generation number may also include the coordinating node assigning the generation number to the request by determining that the current generation number at the coordinating node is equal to the received completed generation number, and then incrementing the current generation number at the coordinating node and assigning the incremented generation number to the request.

The method may further include informing the coordinating node that application of the I/O operations to the replication log has completed. The method may also further include 1) in response to informing the coordinating node that application of the I/O operations to the replication log has completed, receiving acknowledgement from the coordinating node, and 2) after receiving the acknowledgment, signaling that application of the I/O operations has been completed to at least one application that originated the I/O operations.

Assigning the same generation number may include assigning, at a logowner node, the same generation number in response to a request for metadata shipping. Assigning the same generation number may also include receiving, by the logowner node, a plurality of requests for metadata shipping. Assigning the same generation number may also include queuing, by the logowner node, the received requests for metadata shipping in a global queue.

Assigning the same generation number may also include performing, by the logowner node, the following in response to a first I/O operation reaching a stage for generation number assignment: 1) assigning a current generation number to all of the requests already in the global queue, and 2) dequeuing all of the requests already in the global queue after assigning the current generation number. Assigning the same generation number may also include assigning the same generation number to the first I/O operation in part by determining whether a previous generation number is assigned to the first I/O operation.

Assigning the same generation number may include assigning, by the logowner node, the same generation number to the first I/O operation by determining that a previous generation number is assigned, and then either: 1) determining that the previous generation number is equal to a current generation number at the logowner node, and then keeping the previous generation number assigned to the first I/O operation or 2) determining that the previous generation number is less than the current generation number and then assigning the current generation number to the first I/O operation. Assigning the same generation number may also include determining that a generation number is not assigned to the first I/O operation and then incrementing the current generation number and assigning the incremented generation number to the first I/O operation. Assigning the same generation number may further include assigning the incremented generation number to all I/O operations in the global queue and then dequeuing the I/O operations. Assigning the same generation number may also include performing, by the logowner node, these steps in repetition for subsequent I/O operations after the first I/O operation.

Queuing incoming I/O operations for the replication log in the single batch may include queuing the I/O operations prior to transmitting the request for metadata shipping.

In one embodiment, a system for implementing the above-described method may include 1) an identification module programmed to identify a replication log that records the order of writes within a cluster replication system in order to preserve write order fidelity between a primary site and a secondary site, 2) a determination module programmed to determine that the replication log is currently unavailable, and 3) a queuing module programmed to queue incoming I/O operations for the replication log in a single batch while the replication log is unavailable. The determination module may be further programmed to determine that the replication log has become available. The queuing module may be further programmed to cease queuing of incoming I/O operations for the replication log based on the determination that the replication log has become available. The system may further include 4) a grouping module programmed to group a plurality of I/O operations in the single batch for processing in parallel by assigning a same generation number to the plurality of I/O operations, and 5) at least one processor configured to execute the identification module, the determination module, the queuing module, and the grouping module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a replication log that records the order of writes within a cluster replication system in order to preserve write order fidelity between a primary site and a secondary site, 2) determine that the replication log is unavailable, 3) queue incoming I/O operations for the replication log in a single batch while the replication log is unavailable, 4) determine that the replication log has become available, 5) cease queuing of incoming I/O operations for the replication log based on the determination that the replication log has become available, and 6) group a plurality of I/O operations in the single batch for processing in parallel by assigning a same generation number to the plurality of I/O operations.

As will be explained in greater detail below, the systems and methods described herein may enable a cluster replication system to more accurately distinguish between concurrent and dependent writes. The systems and methods may also enable a cluster replication system to apply writes to a replication log as a whole instead of individually, thereby reducing performance overhead. The system and methods may also enable a cluster replication system to distinguish between concurrent and dependent writes without using imprecise write completion times.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
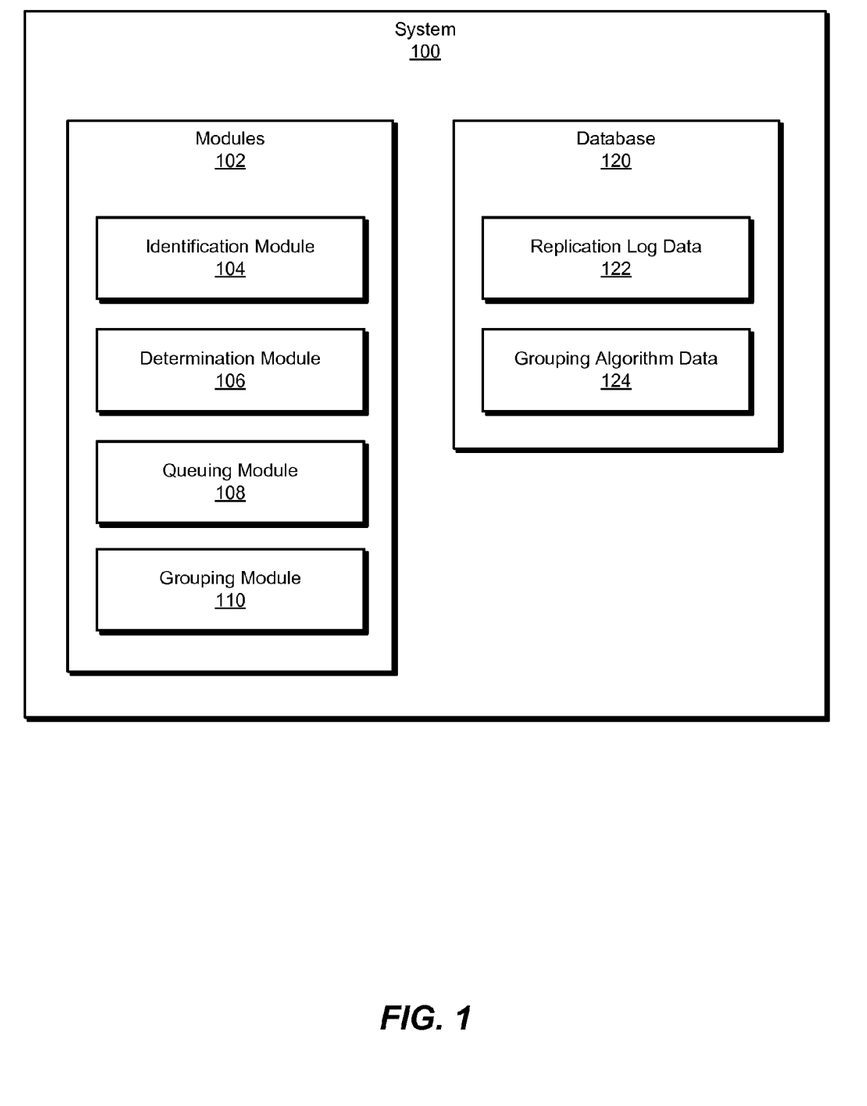
FIG. 1 is a block diagram of an exemplary system for natural batching of I/O operations on a replication log.
Figure 2:
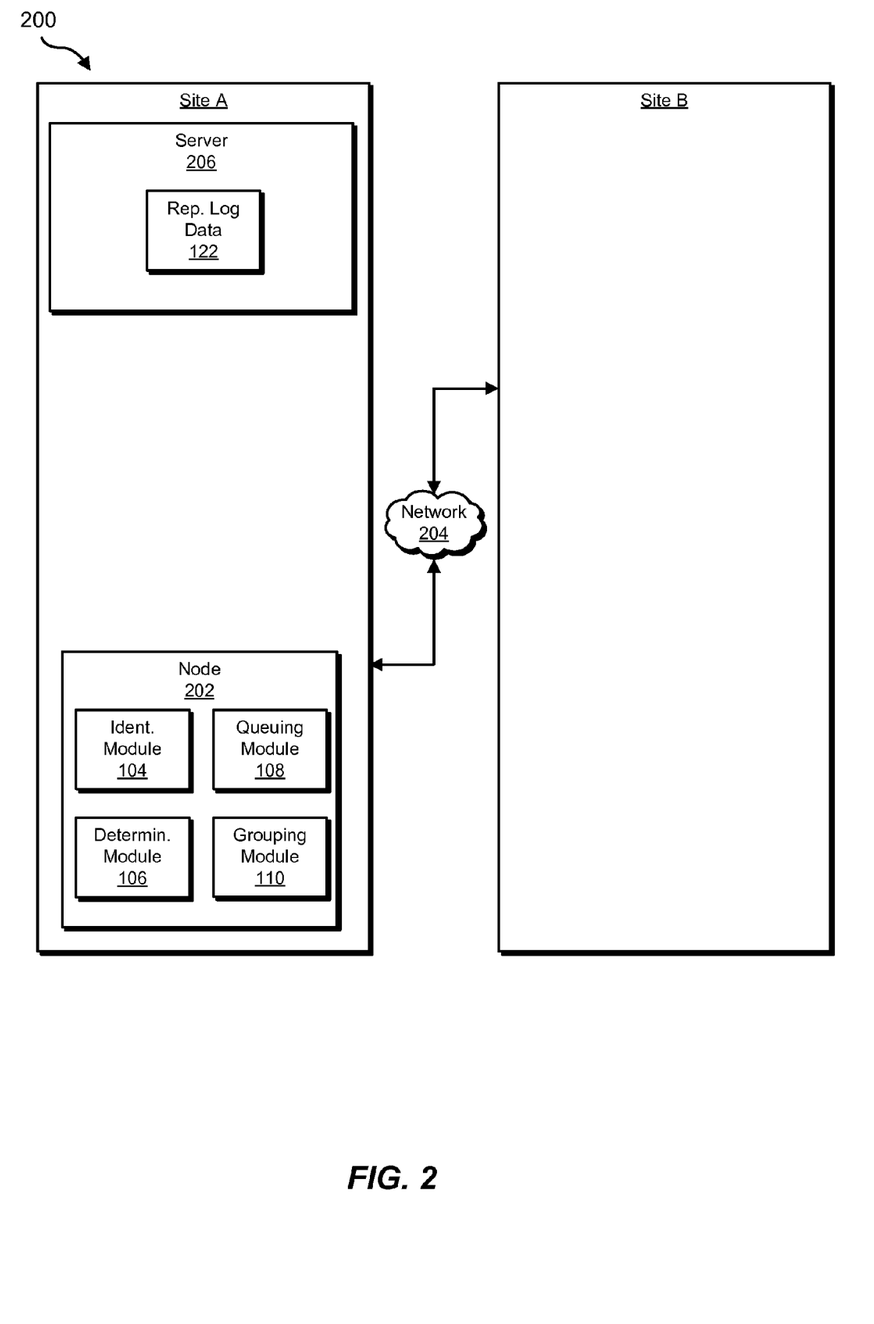
FIG. 2 is a block diagram of an exemplary system for natural batching of I/O operations on a replication log.

The following will provide, with reference to FIGS. 1-2, detailed descriptions of exemplary systems for natural batching of I/O operations on a replication log. Detailed descriptions of corresponding computer-implemented methods will also be provided in connection with FIG. 3. Furthermore detailed descriptions of nodes in a cluster replication system writing to a replication log will be provided in connection with FIG. 4. Moreover, detailed descriptions of computer-implemented methods for assigning a generation number to I/O operations will be provided in connection with FIGS. 5 and 6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for natural batching of I/O operations on a replication log. As illustrated in this figure, exemplary system 100 may include one or more modules 102 for performing one or more tasks. For example, and as will be explained in greater detail below, exemplary system 100 may include an identification module 104 programmed to identify a replication log that records the order of writes within a cluster replication system in order to preserve write order fidelity between a primary site and a secondary site.

Exemplary system 100 may also include a determination module 106 programmed to determine that the replication log is currently unavailable. In addition, and as will be described in greater detail below, exemplary system 100 may include a queuing module 108 programmed to queue incoming I/O operations for the replication log in a single batch while the replication log is unavailable.

Determination module 106 may be further programmed to determine that the replication log has become available. Queuing module 108 may be further programmed to cease queuing of incoming I/O operations for the replication log based on the determination that the replication log has become available.

Exemplary system 100 may also include a grouping module 110 programmed to group a plurality of I/O operations in the single batch for processing in parallel by assigning a same generation number to the plurality of I/O operations.

Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device or node 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store replication log data 122. Replication log data 122 may include a replication log that records the order of writes within a cluster replication system in order to preserve write order fidelity between a primary site and a secondary site. Database 120 may also be configured to store grouping algorithm data 124. Grouping algorithm data 124 may indicate different algorithms that grouping module 110 may use to group I/O operations. These algorithms may include those illustrated in FIGS. 5 and 6 and corresponding algorithms as further discussed below.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device or node 202 in communication with a server 206 via a network 204.

In one embodiment, one or more of modules 102 from FIG. 1 may, when executed by at least one processor of computing device or node 202, enable computing device or node 202 to perform the natural batching of I/O operations on a replication log. For example, and as will be described in greater detail below, one or more of modules 102 may cause computing device 202 to 1) identify a replication log (e.g., replication log data 122) that records the order of writes within a cluster replication system in order to preserve write order fidelity between a primary site and a secondary site, 2) determine that the replication log is currently unavailable, 3) queue incoming I/O operations for the replication log in a single batch while the replication log is unavailable, 4) determine that the replication log has become available, 5) cease queuing of incoming I/O operations for the replication log based on the determination that the replication log has become available, and 6) group a plurality of I/O operations in the single batch for processing in parallel by assigning a same generation number to the plurality of I/O operations.

Computing device or node 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 710 in FIG. 7, or any other suitable computing device.

Server 206 generally represents any type or form of computing device that is capable of managing at least one cluster in a cluster replication system. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing device or node 202 and server 206.

In the example of FIG. 2, exemplary system 200 may include a cluster replication system that is configured to replicate data from primary site A to secondary site B. Server 206 may manage replication operations between site A and site B. Server 206 may include replication log data 122, or replication log data may reside external to server 206. Node 202 may include one or more of identification module 104, determination module 106, queuing module 108, and grouping module 110. These modules may also be separated across one or more other nodes or servers. For example, one node may perform queuing while another node performs grouping. Node 202 may correspond to a coordinating and/or logowner node, as discussed further below.

Figure 3:
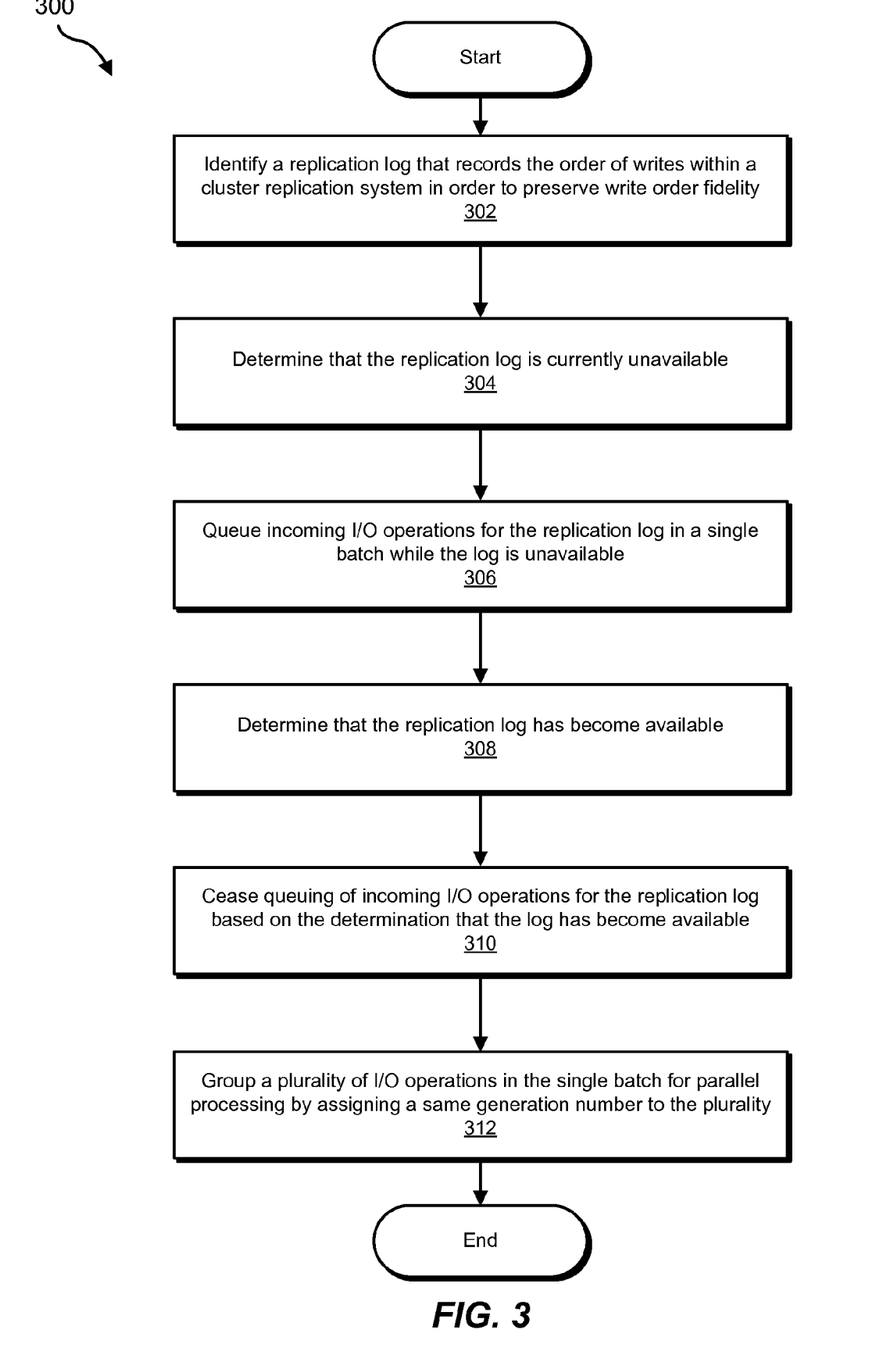
FIG. 3 is a flow diagram of an exemplary method for natural batching of I/O operations on a replication log.

FIG. 3 is a flow diagram of an exemplary computer-implemented method 300 for natural batching of I/O operations on a replication log. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

At step 302, one or more of the systems described herein may identify a replication log that records the order of writes within a cluster replication system in order to preserve write order fidelity between a primary site and a secondary site. For example, identification module 104 may identify a replication log that records the order of writes within a cluster replication system.

Identification module 104 may identify the replication log in a variety of manners. Identification module 104 may identify the replication log by submitting a query to a server, such as server 206. Identification module 104 may also identify the replication log by receiving a message that identifies the replication log. Identification module 104 may receive the message in response to a query from identification module 104, or spontaneously without inquiry by identification module 104. Identification module 104 may also identify the replication log by creating or originating the replication log.

In addition, identification module 104 may identify the replication log in part by identifying a number and/or type of replication log(s) within a cluster or within an entire cluster replication system. Identification module 104 may also identify the replication log by testing or verifying the replication log. Identification module 104 may verify the consistency of the replication log, the type of replication, and/or that the replication log is not overflowing.

Figure 4:
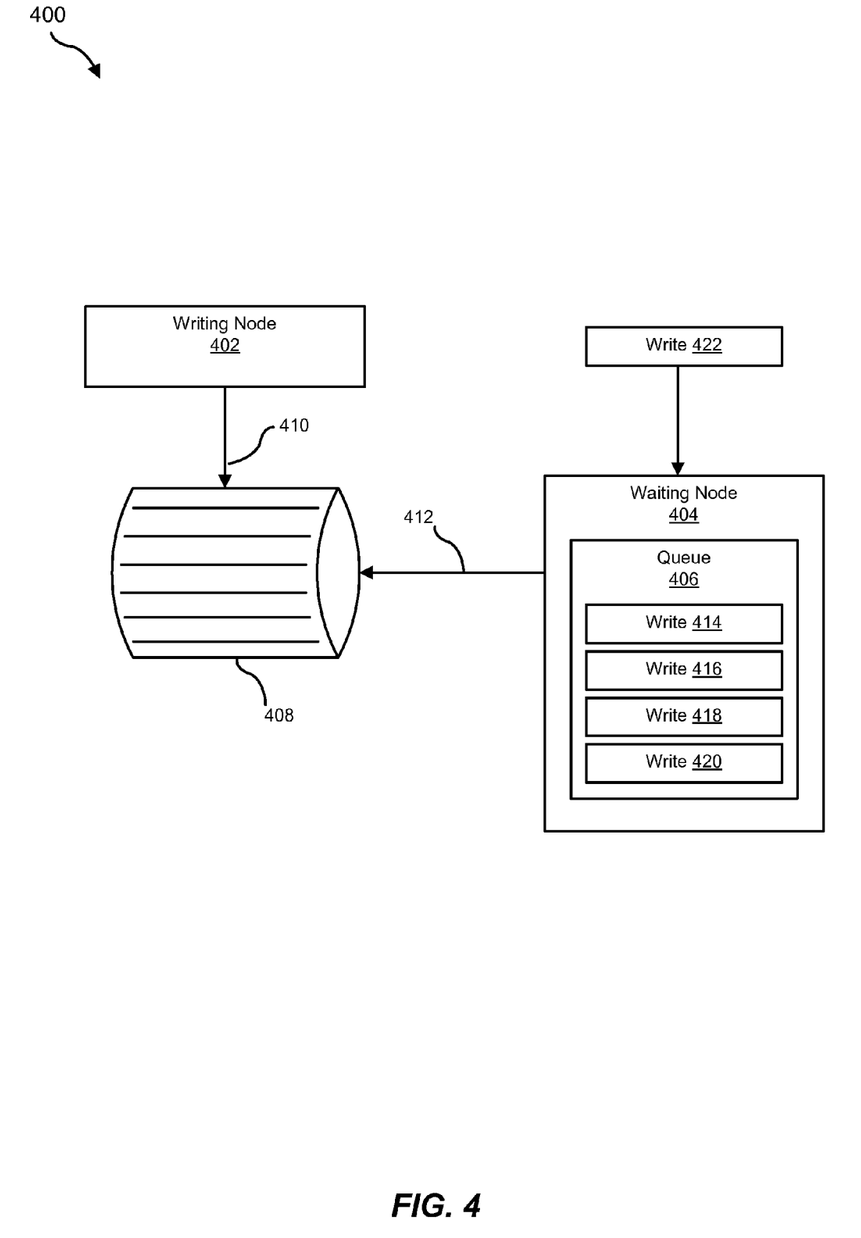
FIG. 4 is a block diagram of exemplary nodes in a cluster replication system attempting to write to a replication log.

FIG. 4 illustrates a block diagram 400 of two nodes, writing node 402 and waiting node 404, that are attempting to write to a replication log 408. Replication log 408 may be a circular buffer of writes that preserves the order of writes for repetition of the order at a secondary site, such as site B in FIG. 2. In the example of FIG. 4, writing node 402 is currently writing 410 to replication log 408. Because replication log 408 is currently occupied with the writes from writing node 402, replication log 408 is unavailable to waiting node 404.

Returning to FIG. 3, at step 304 one or more of the systems described herein may determine that the replication log is currently unavailable. For example, determination module 106 may determine that replication log 408 in FIG. 4 is unavailable.

Determination module 106 may determine that the replication log is unavailable in a variety of manners. The replication log may be unavailable because the replication log is already occupied processing one or more write operations (e.g. by another node). In the example of FIG. 4, determination module 106 may determine that replication log 408 is unavailable because the log is currently processing one or more writes by writing node 402. Additionally, or alternatively, the replication log may be unavailable to a node because the node does not currently possess metadata indicating a position where an I/O operation may be written to the replication log. The replication log may also be unavailable because the cluster replication system denies access to the replication log during an artificial delay period to batch I/O operations.

Determination module 106 may determine that the replication log is unavailable by attempting to perform an I/O operation on the replication log and failing. Determination module 106 may receive an error message in response to the attempt to perform the I/O operation.

Determination module 106 may also submit a query to another node or server (e.g. server 206) about the status of the replication log. Determination module 106 may then receive an indication that the replication log is unavailable in response to the query. The response may or may not indicate a reason why the replication log is unavailable. The replication log may be unavailable because the log is currently processing an I/O operation, as in FIG. 4. The replication log may also be unavailable because of an error, such as an overflow, connectivity, and/or other error.

At step 306, one or more of the systems described herein may queue incoming I/O operations for the replication log in a single batch while the replication log is unavailable. For example, queuing module 108 may queue incoming I/O operation for the replication log in a single batch while the replication log is unavailable.

Queuing module 108 may queue incoming I/O operations in a variety of manners. Queuing module 108 may queue incoming I/O operations by storing a copy of each I/O operation by a node that receives the I/O operation. Queuing module 108 may store the I/O operations locally at the node that receives the incoming operations, at another node, and/or at an external storage location. Queuing module 108 may also store, or queue, the I/O operations in the order in which the operations are received. Queuing module 108 may use a stack, linked list, or other suitable data structure to store the order in which the I/O operations are received. The data structure may organize all of the incoming I/O operations in a single batch. Queuing module 108 may also queue incoming I/O operations for the replication log in the single batch prior to transmitting a request for metadata shipping, as discussed further below in connection with FIG. 6.

In the example of FIG. 4, queuing module 108 may queue incoming I/O operations, such as write 422, in a queue 406 at waiting node 404. Queue 406 may include previously received and queued writes 414, 416, 418, and 420. Queue 406 may store writes received while writing node 402 applies at least one write to replication log 408, thereby rendering the log unavailable. Because the replication log is currently unavailable, waiting node 404 must wait until writing node 402 finishes its writing operation before waiting node may apply 412 its own I/O operations to the replication log.

At step 308, one or more of the systems described herein may determine that the replication log has become available. For example, determination module 106 may determine that the replication log has become available.

Determination module 106 may determine that the replication log has become available in a variety of manners, which may correspond to the manners in which determination module 106 previously determined that the log was unavailable. For example, determination module 106 may attempt to write to the replication log and succeed instead of fail. Determination module 106 may generally ping the replication log with queries or I/O operation attempts at a fixed interval or predetermined schedule. Determination module 106 may also submit queries or indirect I/O operation attempts to other nodes or server 206 to ascertain whether the replication log is available. Determination module 106 may also receive an indication that the replication log is available from the replication log (or database 120), another node, and/or server 206 without determination module 106 first submitting a (renewed) query or write attempt. In other words, one or more of the replication log (or database 120), another node, and/or server 206 may be programmed to inform determination module 106 that the replication log has become available when it does so.

At step 310, one or more of the systems described herein may cease queuing of incoming I/O operations for the replication log based on the determination that the replication log has become available. For example, queuing module 108 may cease queuing of incoming I/O operations for the replication log based on the determination that the replication log has become available.

Queuing module 108 may cease queuing of incoming I/O operations in a variety of manners. Queuing module 108 may release a preexisting queue of I/O operations to grouping module 110 for grouping, as discussed further below. Queuing module 108 may also instruct the writing of previously queued I/O operations to the replication log. Queuing module 108 may also switch to immediately forwarding future incoming I/O operations to grouping module 110 or immediately forwarding the I/O operations for processing on the replication log. Queuing module 108 may generally flush and/or disable its queue. Queuing module 108 may also flush or release I/O operations in its queue in the same order that the I/O operations were received.

At step 312, one or more of the systems described herein may group a plurality of I/O operations in the single batch for processing in parallel by assigning a same generation number to the plurality of I/O operations. For example, grouping module 110 may group a plurality of I/O operations in the single batch for processing in parallel by assigning a same generation number to the plurality of I/O operations.

Grouping module 110 may group the plurality of I/O operations in the single batch for processing in parallel by assigning a same generation number in a variety of manners. For example, grouping module 110 may assign the same generation number to each I/O operation in the single batch.

In addition to assigning the same generation number, grouping module 110 may also attach a header to each of the I/O operations in the single batch. Grouping module 110 may further add padding to align a size of the single batch from an odd to an even size. Grouping module 110 may align the size of the single batch as a whole, instead of aligning the size of each individual I/O operation, to reduce performance overhead. Grouping module 110 may amortize the padding for the batch as a whole across all of the I/O operations in the batch.

Grouping module 110, and/or another module in system 100, may then apply all of the I/O operations in the single batch to the replication log through one logical IO operation. In general, grouping module 110, and/or another module in system 100, may apply all of the I/O operations in the single batch to the replication log through one logical IO operation.

Figure 5:
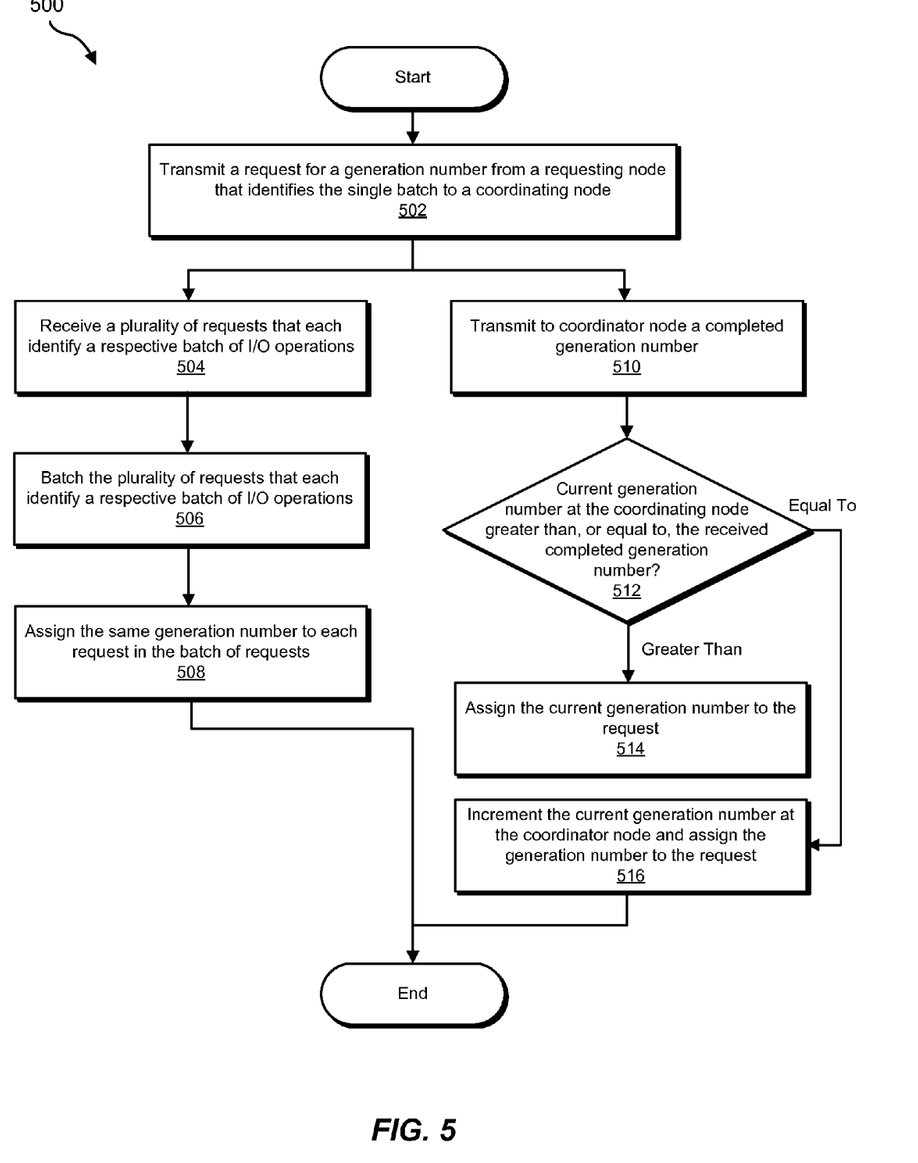
FIG. 5 is a flow diagram of an exemplary method for assigning a generation number to a plurality of I/O operations.

Grouping module 110 may assign the generation number in part by using a coordinating node. FIG. 5 illustrates an exemplary flow diagram showing a method 500 by which grouping module 110 may assign the generation number by using a coordinating node. At step 502, grouping module 110 may transmit a request for a generation number from a requesting node that identifies the single batch to the coordinating node within the cluster replication system. At step 504, the coordinating node may then receive a plurality of requests that each identify a respective batch of I/O operations. At step 506, the coordinating node may batch the plurality of requests that each identify a respective batch of I/O operations. At step 508, the coordinating node may assign the same generation number to each request in the batch of requests. The coordinating node may assign the generation number according to steps 504-508 if the coordinating node has the ability or privilege to write to the replication log directly, for example.

In contrast, if the coordinating node does not have the ability or privilege to write to the replication log directly, then grouping module 110 may use a different formula for assigning the generation number. At step 510, grouping module 110 may transmit, by a transmitting node to the coordinating node, a completed generation number that identifies a generation number of at least one I/O operation last applied to the replication log by the transmitting node. The completed generation number may also identify at least one I/O operation last applied to the primary site, such as primary site A in FIG. 2 (or at least one I/O operation last applied to both the replication log and the primary site). At decision 512, grouping module 110 may determine whether a current generation number at the coordinating node is greater than the received completed generation number at the requesting node. If the current generation number is greater than the received completed generation number, then at step 514 grouping module 110 may assign the current generation number to the request. Alternatively, if the current generation number is equal to the received completed generation number, then at step 516 grouping module 110 may increment the current generation number at the coordinating node and assign the generation number to the request. From step 508, step 514, or step 516, method 500 may end.

Upon assigning the generation number according to the method of FIG. 5, grouping module 110 may further inform the coordinating node that application of the I/O operations to the replication log has completed. In response to informing the coordinating node that application of the I/O operations to the replication log has completed, grouping module 110 may receive acknowledgement from the coordinating node. After receiving the acknowledgment, grouping module 110 may signal that application of the I/O operations has been completed to at least one application that originated the I/O operations.

Grouping module 110 may also assign the same generation number in response to a request for metadata shipping. As defined herein, metadata shipping refers to a node requesting, from a logowner node that assigns replication log positions, metadata that indicates a replication log position for performing an I/O operation on the replication log. Assigning the same generation number may include receiving, by the logowner node, a plurality of requests for metadata shipping. Assigning the same generation number may further include queuing, by the logowner node, the received requests for metadata shipping in a global queue. In response to a first I/O operation reaching a stage for generation number assignment, grouping module 110 may assign a current generation number to all of the requests already in the global queue, and may dequeue all of the requests already in the global queue after assigning the current generation number. As defined herein, "reaching a stage for generation number assignment" refers to an I/O operation reaching a point in software logic that assigns the generation number to the I/O operation.

Figure 6:
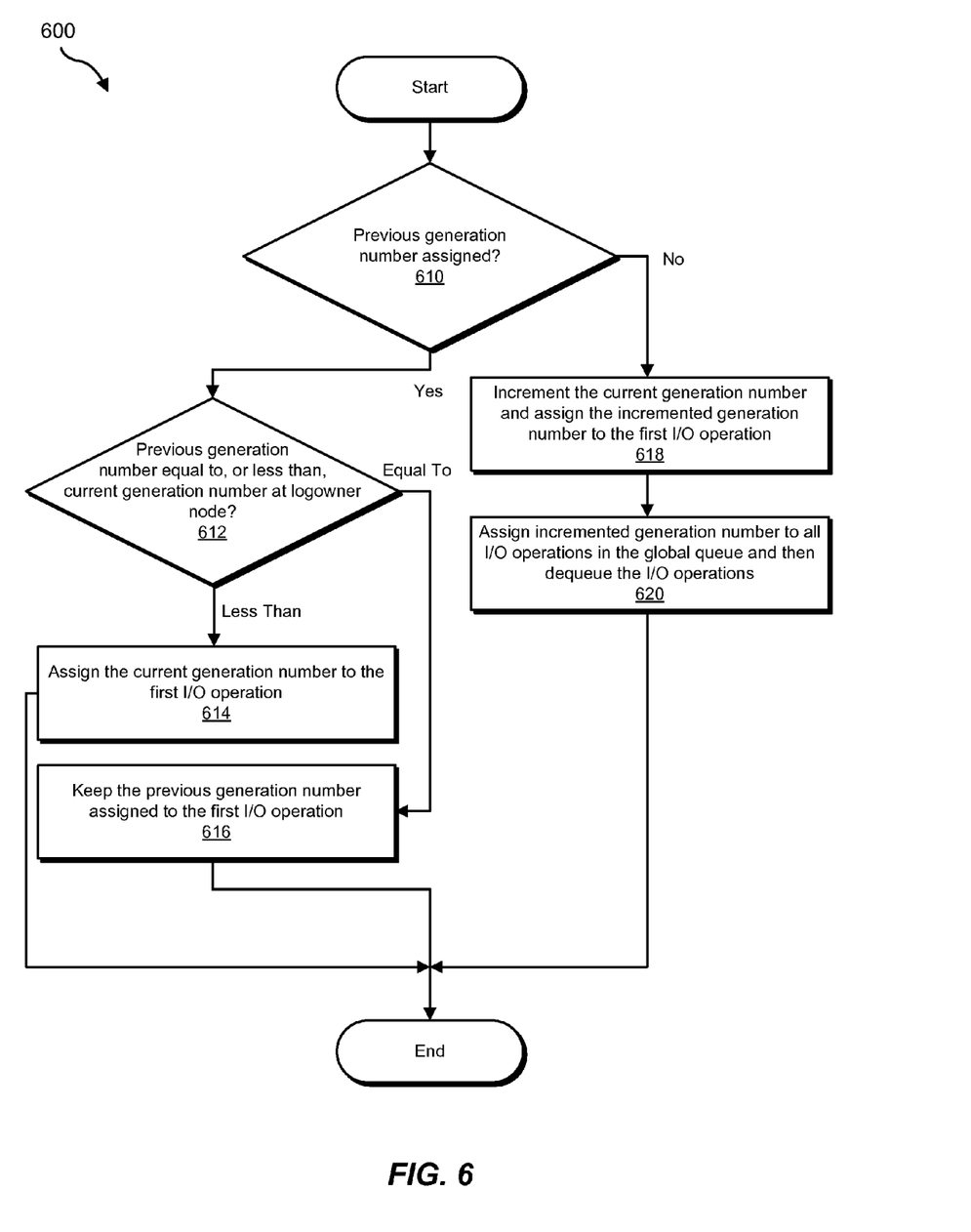
FIG. 6 is a flow diagram of an exemplary method for assigning a generation number to a plurality of I/O operations.

FIG. 6 illustrates a flow diagram showing a method 600 by which grouping module 110 may assign the same generation number in response to a request for metadata shipping. Grouping module 110 may perform method 600 after dequeuing all of the requests already in the global queue after assigning the current generation number, as discussed above. At decision 610 grouping module 110 may determine whether a previous generation number is assigned to the first I/O operation. If a previous generation number is assigned, then at decision 612 grouping module may determine whether the previous generation number is equal to, or less than, a current generation number at the logowner node. If less, then at step 614 grouping module 110 may assign the current generation number to the first I/O operation. If equal, then at step 616 grouping module 110 may keep the previous generation number assigned to the first I/O operation.

Alternatively, if grouping module 110 determines that no previous generation number is assigned at decision 610, then at step 618 grouping module 110 may increment the current generation number. Grouping module 110 may further assign the incremented generation number to the first I/O operation. Additionally, at step 620 grouping module 110 may assign the incremented generation number to all I/O operations in the global queue and then dequeue the I/O operations. From step 614, step 616, or step 620, method 600 may end. Alternatively, grouping module 110 may repeat method 600 for all subsequent I/O operations after the first I/O operation.

Grouping module 110 may perform method 600 as step 312 of method 300 through a logowner node, after another node queues I/O operations according to steps 302-610 and then requests metadata. Alternatively, grouping module 110 may perform method 600 through a logowner node independently to group I/O operations by assigning the same generation number without necessarily the performance of steps 302-310.

As described above, the systems and methods described herein may enable a cluster replication system to more accurately distinguish between concurrent and dependent writes. The systems and methods may also enable a cluster replication system to apply writes to a replication log as a whole instead of individually, thereby reducing performance overhead. The system and methods may also enable a cluster replication system to distinguish between concurrent and dependent writes without using imprecise write completion times.

Figure 7:
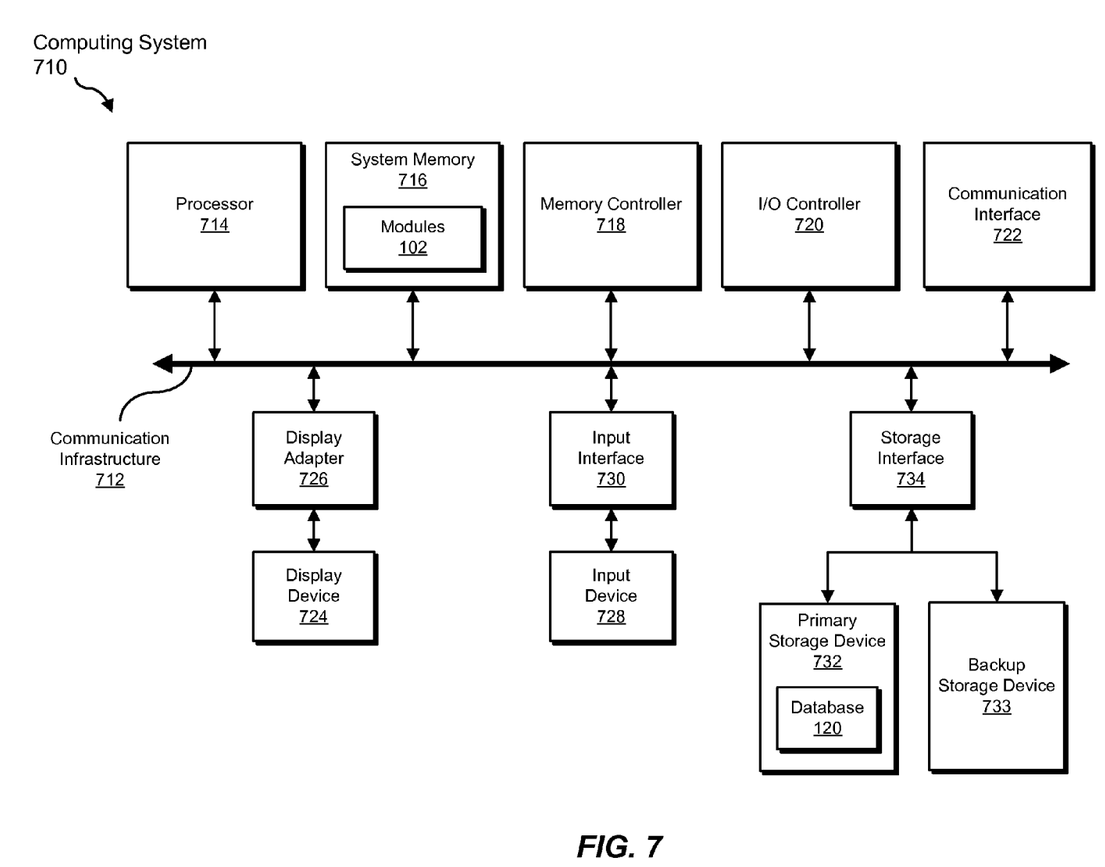
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the identifying, determining, queuing, ceasing, grouping, assigning, applying, attaching, padding, receiving, batching, transmitting, informing, signaling, dequeuing, and performing steps described herein. All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710.

Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
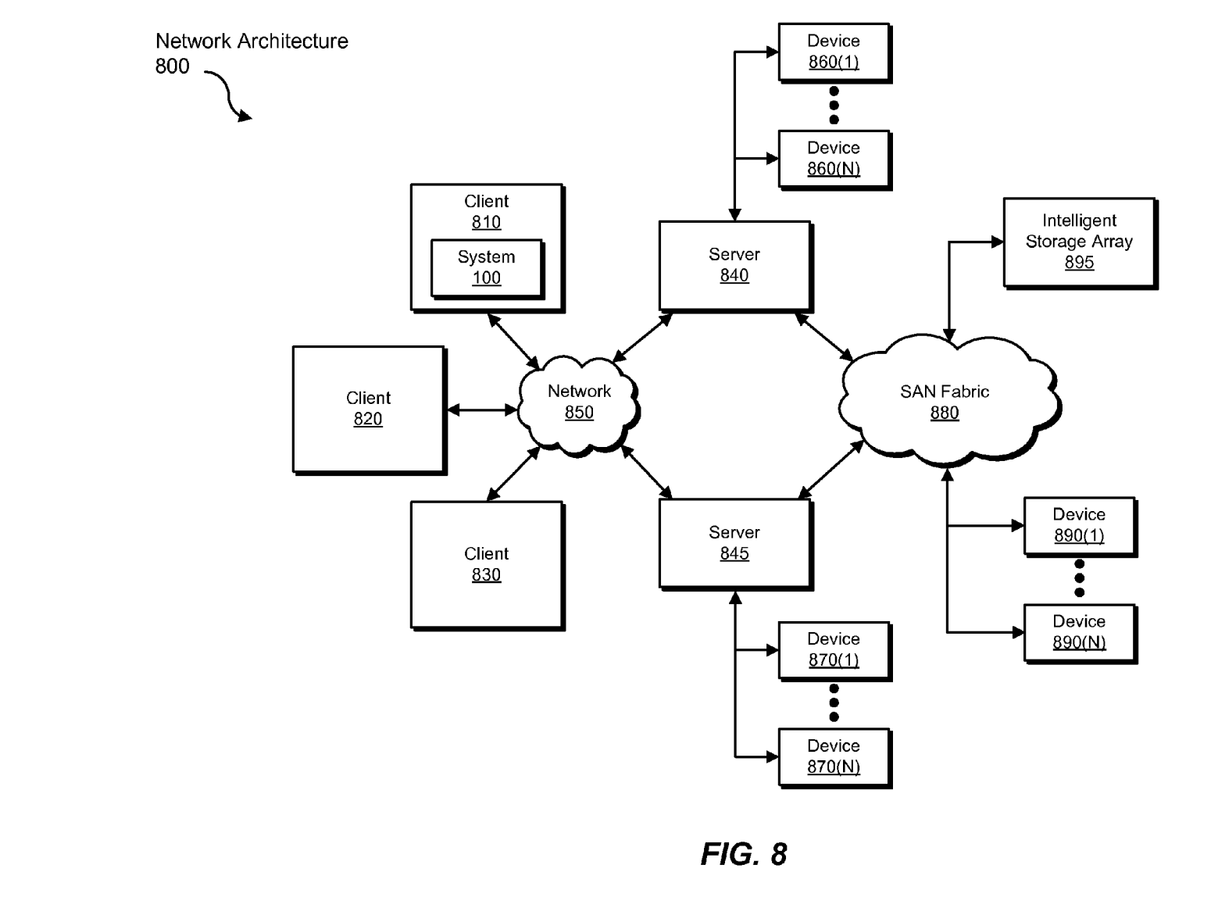
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the identifying, determining, queuing, ceasing, grouping, assigning, applying, attaching, padding, receiving, batching, transmitting, informing, signaling, dequeuing, and performing steps disclosed herein. All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for natural batching of I/O operations on a replication log.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform physical computing systems by replicating data from one computing system to another computing system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for natural batching of I/O operations on a replication log, at least a portion of the method being performed by a computing device comprising at least one processor, the method comprising:
    identifying a replication log that records the order of writes within a cluster replication system in order to preserve write order fidelity between a primary site and a secondary site;
    determining that the replication log is currently unavailable;
    queuing incoming I/O operations for the replication log in a single batch while the replication log is unavailable;
    determining that the replication log has become available;
    ceasing queuing of incoming I/O operations for the replication log based on the determination that the replication log has become available;
    grouping a plurality of I/O operations in the single batch for processing in parallel by assigning a same generation number to the plurality of I/O operations in response to one of:
        a request for a generation number transmitted from a requesting node that identifies the single batch to a coordinating node within the cluster replication system;
        a request for metadata shipping transmitted from the requesting node to a logowner node.

2. The computer-implemented method of claim 1, wherein assigning the same generation number comprises assigning the same generation number to each I/O operation in the single batch.

3. The computer-implemented method of claim 2, further comprising applying all of the I/O operations in the single batch to the replication log through one logical IO operation.

4. The computer-implemented method of claim 3, further comprising, prior to applying the I/O operations in the single batch to the replication log:
    adding padding to align a size of the single batch from an odd to an even size.

5. The computer-implemented method of claim 1, wherein assigning the same generation number is performed in response to the request for the generation number transmitted from the requesting node that identifies the single batch to the coordinating node within the cluster replication system.

6. The computer-implemented method of claim 5, wherein the coordinating node:
   receives a plurality of requests that each identify a respective batch of I/O operations;
   batches the plurality of requests that each identify a respective batch of I/O operations;
   assigns the same generation number to each request in the batch of requests.

7. The computer-implemented method of claim 5, wherein assigning the same generation number comprises transmitting, by a transmitting node to the coordinating node, a completed generation number that identifies a generation number of at least one I/O operation last applied to the replication log by the transmitting node.

8. The computer-implemented method of claim 7, wherein assigning the same generation number comprises assigning, by the coordinating node, the same generation number to the request by at least one of:
   determining that a current generation number at the coordinating node is greater than the received completed generation number at the requesting node, and then assigning the current generation number to the request;
   determining that the current generation number at the coordinating node is equal to the received completed generation number, and then incrementing the current generation number at the coordinating node and assigning the incremented generation number to the request.

9. The computer-implemented method of claim 8, further comprising informing the coordinating node that application of the I/O operations to the replication log has completed.

10. The computer-implemented method of claim 9, further comprising:
    in response to informing the coordinating node that application of the I/O operations to the replication log has completed, receiving acknowledgement from the coordinating node;
    after receiving the acknowledgment, signaling that application of the I/O operations has been completed to at least one application that originated the I/O operations.

11. The computer-implemented method of claim 1, wherein assigning the same generation number is performed at the logowner node in response to the request for metadata shipping transmitted from the requesting node to the logowner node.

12. The computer-implemented method of claim 11, wherein assigning the same generation number comprises receiving, by the logowner node, a plurality of requests for metadata shipping.

13. The computer-implemented method of claim 12, wherein assigning the same generation number comprises queuing, by the logowner node, the received requests for metadata shipping in a global queue.

14. The computer-implemented method of claim 13, wherein assigning the same generation number comprises performing, by the logowner node, the following in response to a first I/O operation reaching a stage for generation number assignment:
    assigning a current generation number to all of the requests already in the global queue;
    dequeuing all of the requests already in the global queue after assigning the current generation number.

15. The computer-implemented method of claim 14, wherein assigning the same generation number comprises assigning the same generation number to the first I/O operation in part by determining whether a previous generation number is assigned to the first I/O operation.

16. The computer-implemented method of claim 15, wherein assigning the same generation number comprises assigning, by the logowner node, the same generation number to the first I/O operation by one of:
    determining that a previous generation number is assigned, and then either:
    determining that the previous generation number is equal to the current generation number at the logowner node, and then keeping the previous generation number assigned to the first I/O operation;
    determining that the previous generation number is less than the current generation number and then assigning the current generation number to the first I/O operation;
    determining that a generation number is not assigned to the first I/O operation and then incrementing the current generation number and then:
    assigning the incremented generation number to the first I/O operation;
    assigning the incremented generation number to all I/O operations in the global queue and then dequeuing the I/O operations.

17. The computer-implemented method of claim 16, wherein assigning the generation number comprises performing, by the logowner node, the method of claim 16 in repetition for subsequent I/O operations after the first I/O operation.

18. The computer-implemented method of claim 11, wherein queuing incoming I/O operations for the replication log in the single batch comprises queuing the I/O operations prior to transmitting the request for metadata shipping.

19. A system for natural batching of I/O operations on a replication log, the system comprising:
    an identification module programmed to identify a replication log that records the order of writes within a cluster replication system in order to preserve write order fidelity between a primary site and a secondary site;
    a determination module programmed to determine that the replication log is currently unavailable;
    a queuing module programmed to queue incoming I/O operations for the replication log in a single batch while the replication log is unavailable, wherein:
    the determination module is further programmed to determine that the replication log has become available,
    the queuing module is further programmed to cease queuing of incoming I/O operations for the replication log based on the determination that the replication log has become available,
    the system further comprises:
    a grouping module programmed to group a plurality of I/O operations in the single batch for processing in parallel by assigning a same generation number to the plurality of I/O operations in response to one of:
    a request for a generation number transmitted from a requesting node that identifies the single batch to a coordinating node within the cluster replication system;
    a request for metadata shipping transmitted from the requesting node to a logowner node;
    at least one processor configured to execute the identification module, the determination module, the queuing module, and the grouping module.

20. A non-transitory computer-readable-storage medium comprising one or more computer-executable instructions that, when executed by at least one processor of a computing device, cause the computing device to:

identify a replication log that records the order of writes within a cluster replication system in order to preserve write order fidelity between a primary site and a secondary site;
determine that the replication log is unavailable;
queue incoming I/O operations for the replication log in a single batch while the replication log is unavailable;
determine that the replication log has become available;
cease queuing of incoming I/O operations for the replication log based on the determination that the replication log has become available;
group a plurality of I/O operations in the single batch for processing in parallel by assigning a same generation number to the plurality of I/O operations in response to one of:
  a request for a generation number transmitted from a requesting node that identifies the single batch to a coordinating node within the cluster replication system;
  a request for metadata shipping transmitted from the requesting node to a logowner node.

* * * * *